March 10, 1936.    E. R. SCHOFIELD    2,033,306
FLOW METER
Filed Feb. 12, 1935    3 Sheets-Sheet 1
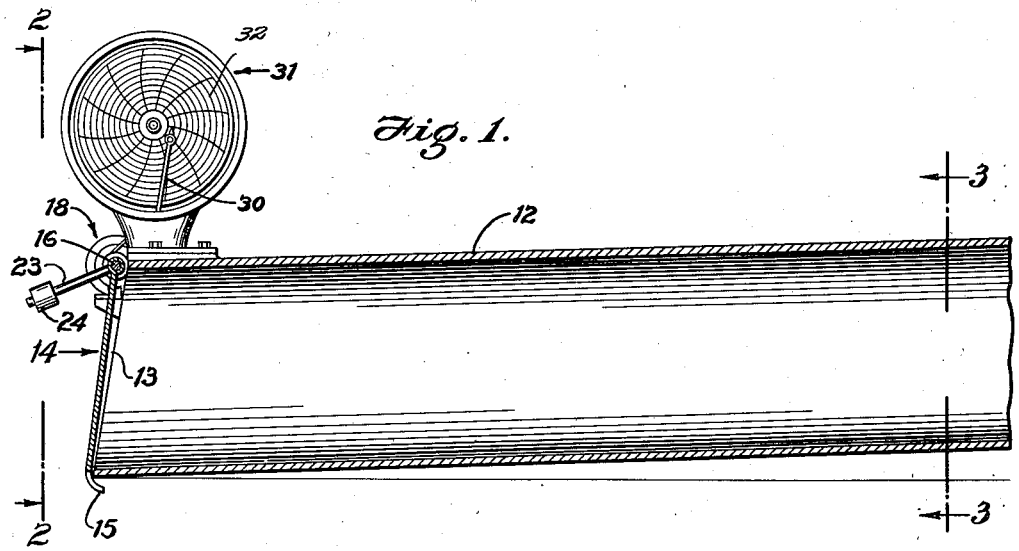
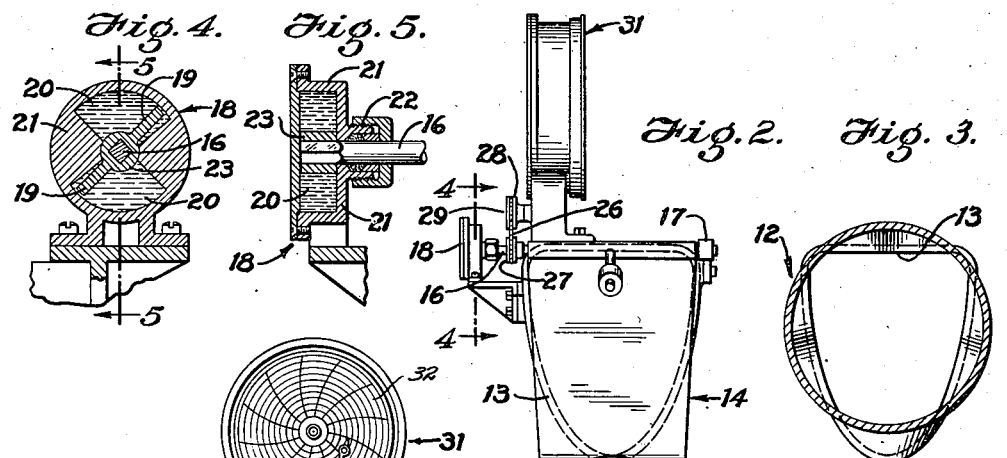
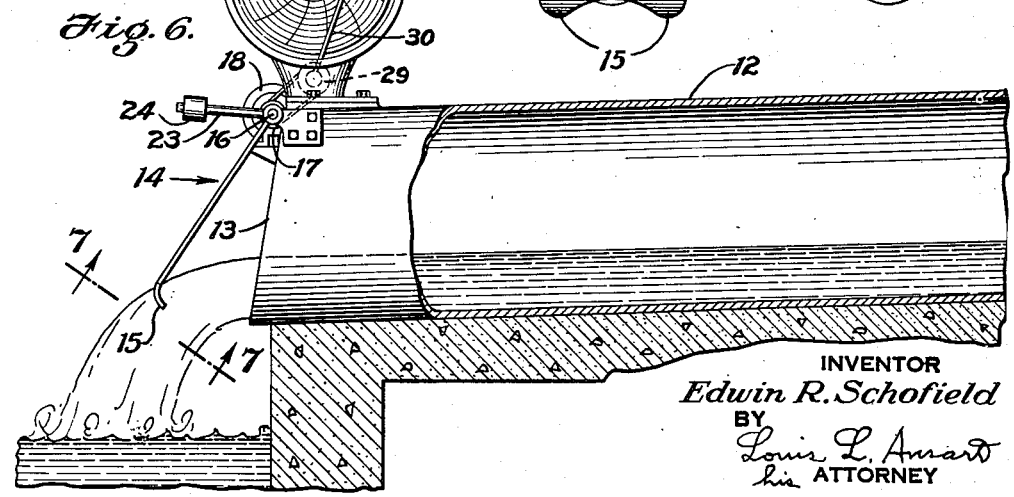
INVENTOR
Edwin R. Schofield
BY
his ATTORNEY

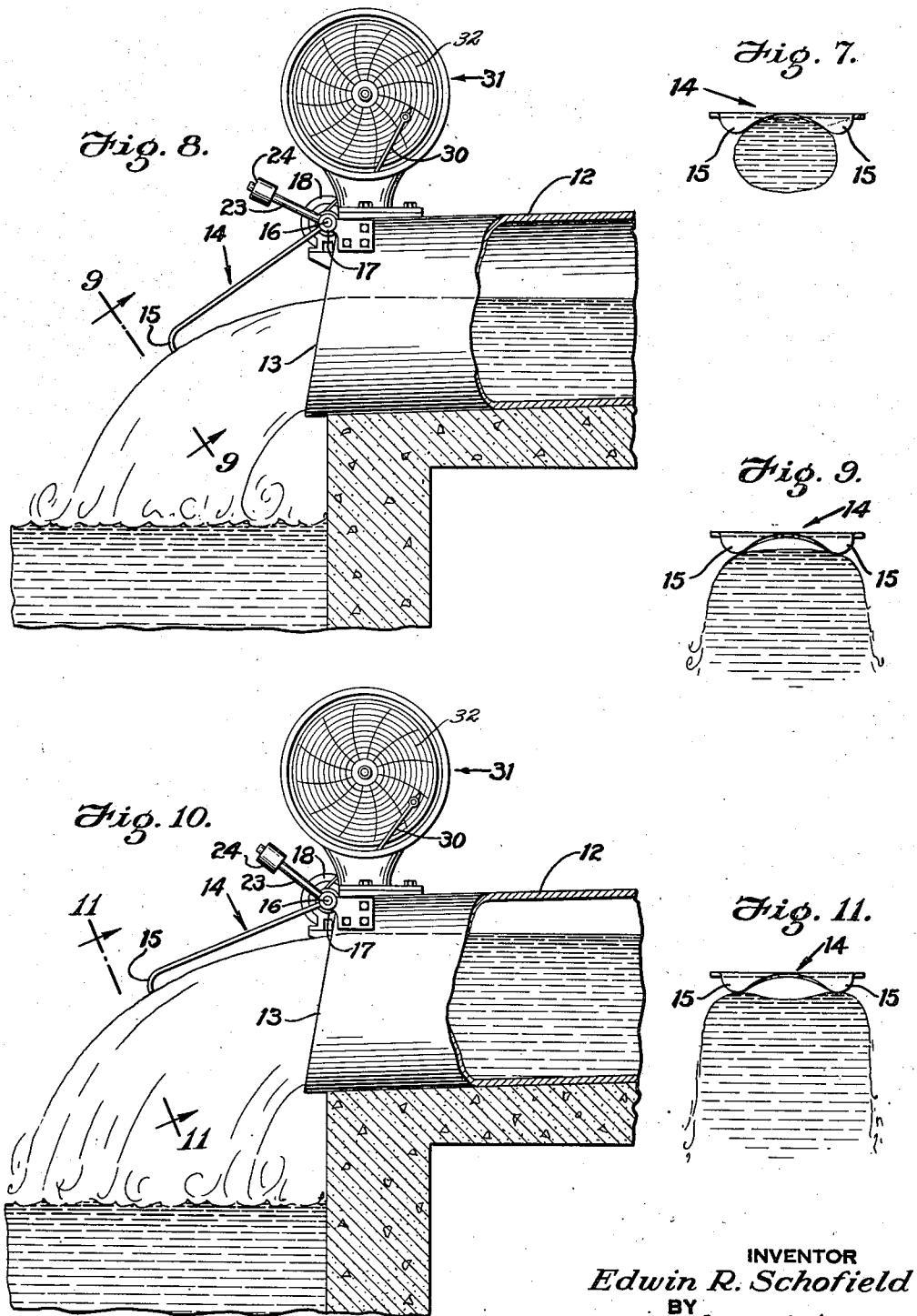

March 10, 1936.  E. R. SCHOFIELD  2,033,306
FLOW METER
Filed Feb. 12, 1935   3 Sheets-Sheet 3

INVENTOR.
Edwin R. Schofield
BY Louis L. Ansart
his ATTORNEY

Patented Mar. 10, 1936

2,033,306

UNITED STATES PATENT OFFICE 2,033,306

FLOW METER

Edwin R. Schofield, Philadelphia, Pa.

Application February 12, 1935, Serial No. 6,181

15 Claims. (Cl. 73—167)

This invention relates to flow meters and more particularly to flow meters which are especially adapted for measuring the flow in pipes or ducts where the stream only partially fills the same, and are of particular value in sewerage systems in measuring the flow from smaller or branch sewers into main or interceptor sewers for purposes such, for example, as getting data for determining the requisite capacity of flow for such main and interceptor sewers. This application is a continuation in part of my copending application Serial No. 678,163, filed June 29, 1933.

The arrangement is such that all of the stream to be measured flows through a single passage to an outlet and there are no small pipes or passages to be clogged. The stream flowing from the outlet strikes an impact member or flap preferably mounted to swing about a horizontal axis. The outlet is preferably narrowed toward its bottom whereby a higher velocity will be imparted to the smaller flows and collection of sewage solids and the like will be prevented, and may take the general form of a half ellipse pointing downwardly, that is with its minor axis at the top, this shape having been found more desirable than a triangular shape inasmuch as it gives, on a chart, a wider spread for the higher quantities. The angular motion of the impact member is dependent upon the volume of flow through the outlet and the impact member, through suitable connections operates devices which may indicate and record the volume of flow.

In said copending application the impact flap or plate was disclosed as shaped so as substantially to fit the outlet end of the passage or pipe. This form of impact flap or member gave very satisfactory results for a considerable variation in the flow, that is so long as the surface of the stream, as shown by a cross section thereof, remains convex with its high point substantially at the middle of the stream. The point of the impact member is supported by the highest part of the surface of the liquid flowing through the outlet.

If, however, the volume of flow rises above a certain point, the surface of the liquid at the middle of the stream does not rise to a corresponding extent and the upper surface becomes concave, as seen at the top of a cross section of the stream. Under such conditions the pointed flap cannot measure the flow accurately.

According, however, to the preferred form of the present invention, there is provided an impact flap whose contact or impact end is so shaped as to enable accurate measurements to be made whether the surface of the stream is convex or concave at its middle. For this purpose the lower end of the flap is so formed that its central portion is engaged by the surface of the liquid when it is convex and the corner portions are engaged when the surface of the liquid is concave, the corner portions being extended in the form of ears and then turned back in order that they may extend sufficiently into the path of the liquid. The profile is such that it fits around the convex surface for the lower flows and the ears are entirely clear of the liquid, and for the higher flows the ears do the work and finally lift the center portion almost clear of the flow. The range of most meters of this type is about twelve times the minimum whereas with the use of the present invention the range may be increased to about twenty times the minimum without sacrifice of accuracy.

Other features, objects and advantages will appear upon consideration of the following detailed description and of the drawings in which:

Fig. 1 is a vertical section taken longitudinally of the pipe portion of the meter;

Fig. 2 is a view in elevation taken along the line 2—2 of Fig. 1;

Fig. 3 is a section of the pipe portion taken along the line 3—3 of Fig. 1;

Fig. 4 is a section taken along the line 4—4 of Fig. 2;

Fig. 5 is a section taken along the line 5—5 of Fig. 4;

Fig. 6 is a side elevation, partly in section and partly broken away, illustrating the flow meter in operation in measuring the lower flows;

Fig. 7 is a section taken on the line 7—7 of Fig. 6;

Fig. 8 is a view similar to Fig. 6 but illustrating the flap as raised by a higher flow of liquid;

Fig. 9 is a section on the line 9—9 of Fig. 8;

Fig. 10 is a view similar to Figs. 6 and 8 but illustrating the effect of a still higher flow;

Fig. 11 is a section on the line 11—11 of Fig. 10;

Figure 12:
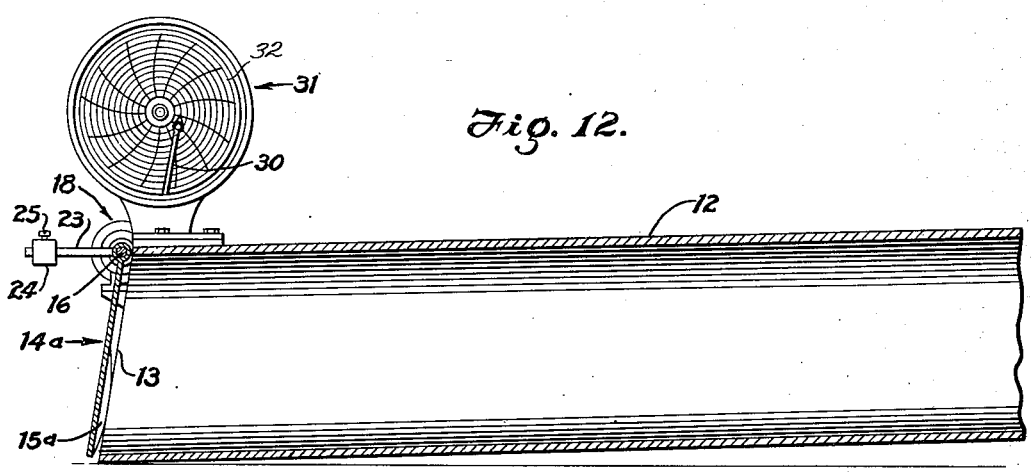
Figs. 12 and 13 are views similar respectively to Figs. 1 and 6 but showing a modified form of flap.

Referring to Figs. 1 to 6 inclusive of the drawings, reference character 12 designates a hollow member preferably a section of cast iron pipe from 6 to 8 feet long, having its discharge end or outlet 13 in the form of a suitably proportioned half ellipse. Preferably the pipe 12, as clearly indicated in Fig. 3, changes gradually from a circular cross section to a half-ellipse cross section at the outlet, the ellipse being divided along its minor axis. The pipe 12 is installed (Fig. 6) so that liquid such as sewage may flow freely from its outlet and there engage a suitable device such as an impact flap or plate and position it in correspondence with the rate of flow from said outlet. The impact plate 14 is preferably made of copper or some other corrosion resisting material and, as will hereinafter be described, its lower end is so shaped as to be engaged by the sewage stream in such a way that the swinging of the flap will be in definite relation with the rate of flow.

The pipe 12 is cut back at the top at the outlet end so that the swinging plate when in its lowermost position will be inclined. This assists in avoiding a pendulum movement of about 10 degrees experienced where the outlet end of the pipe is vertical. Preferably the plate or flap 14 is mounted on a shaft 16 supported at one end in a bearing 17 and at its other end by a vibration dampener 18 that assists in stabilizing the movement of the impact plate 14. As here shown, the vibration dampener consists of a pair of wings 19 mounted on the end of the shaft 16 and moving in oil in two sector-shaped compartments 20 in a fixed casing 21, the oil being held in these compartments by means of a stuffing box 22 through which the shaft 16 extends. The wings 19 are shown as mounted on a hub 23 which fits closely in an opening between the compartments 20. There may be a slight clearance between the wing structure and the inner surfaces of the compartments so that while the movement of the wings is resisted they will not interfere excessively with the movement of the plate 14. To return the impact plate 14 toward the outlet 13 when the flow falls off use may be made of an arm 23 on which a weight 24 is adjustable and may be secured in adjusted position by means of a set screw 25.

As the liquid rushes or leaps from the outlet 13 of the pipe 12, it strikes the impact plate 14 with considerable force, causing it to swing and turn the shaft 16 to an extent proportional to the flow. This angular movement of the shaft may be transmitted by means of a cable or belt 26 and sheaves 27 and 28 to a shaft 29 carrying an index 30 of an indicating and recording device 31. The index 30 may be provided with a suitable marking device to make a record on a rotating card or chart 32 made to fit the calibration of the meter. Where it is desired to have the indicating and recording device at a considerable distance from the meter, use may be made of any suitable long distance recording device.

The foregoing description applies equally well to said copending application. The most important difference between the two forms of the invention resides in the forms of the impact members or flaps. The flap 14a disclosed in the instant application (Figs. 12, 13 and 14), as well as in said copending application, is of substantially the same shape as the outlet and therefore has a pointed lower end which rides on the stream of liquid and accurately measures the flow as long as the upper surface of the liquid is convex, as indicated in a somewhat exaggerated way on Fig. 7 of this application. When, however, the surface sags at the middle of the stream and eventually becomes concave, as indicated in Fig. 11, the pointed flap fails to measure the flow.

According to the preferred form of the invention, provision is made of a flap 14 which can be used to measure the flow accurately for both large and small flows. Accordingly, use may be made of a new form of flap, of which the middle of its lower edge contacts with the surface of the liquid to measure low flows (Figs. 6 and 7), that is when the liquid surface is convex at the middle of the stream, and ears 15 projecting beyond said middle at opposite sides thereof engage the surface when the middle of the stream surface sags (Figs. 8 to 11). In order to obtain effective results with these ears 15, they are bent back preferably in the general form of an arc of a circle. It should be understood that the convexity and concavity of the upper surface of the stream are much exaggerated in Figs. 7, 9 and 11 in order to make the action clear.

Figure 14:
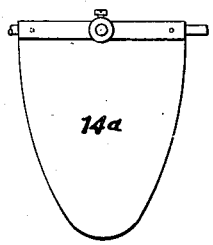
Fig. 14 is a front view of the modified flap.
Figure 13:
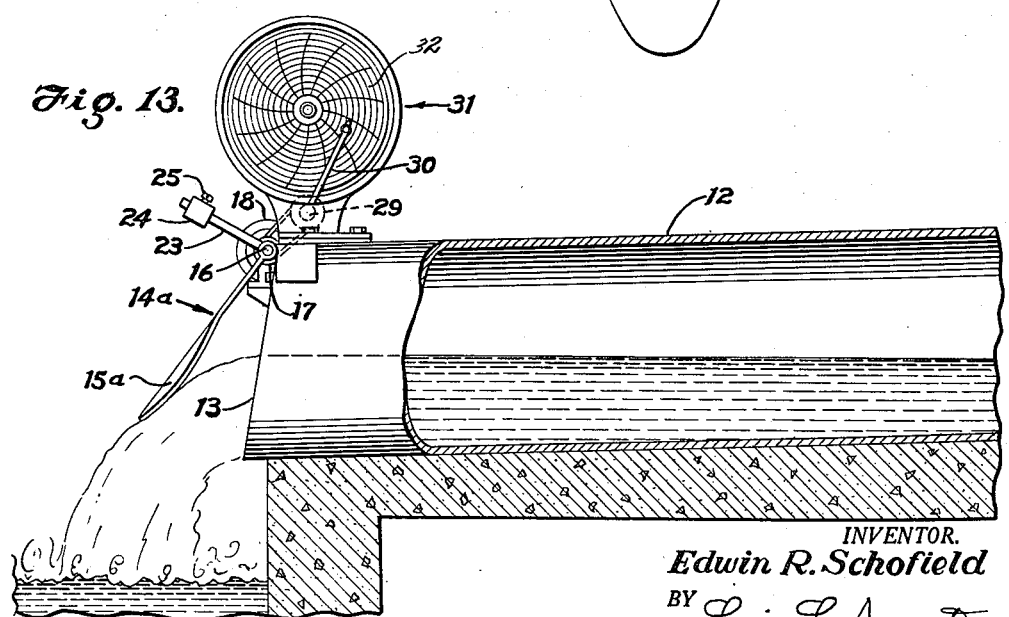

It should be noted that the flap 14a, illustrated in Figs. 12, 13 and 14, is provided at its side edges with parts or wings 15a which extend rearwardly, that is toward said outlet, and may serve to stabilize the motion of the flap and also limit its movement toward the pipe outlet so as to provide some clearance at all times. It should be understood that the flap 14a may be mounted in the same general way as flap 14 and the movement of the flap may be utilized in the same general way for measuring flows.

In operation, the flaps are swung to a greater or less extent in accordance with the rates of flow and in each case through an index 30 and a rotating card or chart 32 indicate at any time the rate of flow of the liquid through the outlet.

It should be understood that various changes may be made in construction and arrangement of parts and that various features may be used without others without departing from the true spirit and scope of the invention.

Having thus described my invention, I claim:

1. In apparatus for measuring the gravity flow of a stream partially filling a conduit, the combination of a conduit arranged so that the liquid of the gravity flow will be liberated as it flows from the outlet end of the conduit, said outlet end being narrowed toward its bottom to increase the velocity of discharge for small flows, a flap suspended from above across said outlet so as to be swung outwardly by the impact thereagainst of the stream discharging through said outlet, and means operated by said flap to indicate the flow through said conduit.

2. In apparatus for measuring the gravity flow of streams partially filling conduits, the combination of a conduit arranged so that the liquid of the gravity flow will be liberated as it flows from the outlet end of the conduit, said outlet end being narrowed toward its bottom to increase the velocity of discharge for small flows, a flap corresponding in shape with said outlet and suspended from above across said outlet so as to be swung outwardly by the impact of liquid thereagainst, and means operated by said flap to indicate the flow through said conduit.

3. In apparatus for measuring the flow of streams partially filling conduits, the combination of a conduit having at one end an outlet in the form of a half ellipse with the minor axis of the ellipse at the top, a flap corresponding in size and shape with said outlet and suspended from above across said outlet so as to be swung outwardly by the impact of liquid thereagainst, and means operated by said flap to indicate the amount of flow through said conduit.

4. In apparatus for measuring the flow of a stream partially filling a conduit, the combination of a conduit arranged so that liquid will flow freely from the outlet end thereof, said outlet end being narrowed toward its bottom to increase the velocity of discharge for small flows, a flap suspended from above across said outlet to be swung outwardly by the impact of liquid thereagainst, a portion of the flap cooperating with the used portion of the outlet end and being shaped to fit over the same, and means operated by said flap to indicate the flow through said conduit, said outlet end of the conduit being inclined rearwardly from the bottom to the top thereof and the flap being correspondingly inclined when in its lowermost position to assist in stabilizing the flap.

5. In apparatus adapted to measure the flow of a stream partially filling a conduit, the combination of a conduit arranged to discharge liquid freely from its outlet, said outlet being narrowed toward its bottom, a flap corresponding in shape with the used portion of said outlet and adapted to close the same; said flap being suspended from above across said outlet to lie close to the outlet when there is no flow through the conduit and to be swung outwardly by the impact of liquid thereagainst, means limiting the movement of said flap toward said outlet to maintain clearance therebetween at all times, and means operated by said flap for indicating the flow through said conduit.

6. In apparatus adapted to measure the flow of a stream partially filling a conduit, the combination of a conduit arranged to discharge liquid freely from its outlet, said outlet being narrowed toward its bottom, a flap suspended from above across said outlet to be close to the outlet when there is no flow and to be swung outwardly by the impact of liquid thereagainst, said flap being shaped to fit over the used portion of said outlet, wings extending from the edges of the flap toward said outlet to assist in stabilizing the flap and to limit the inward movement of the flap to provide clearance at all times, and means operated by said flap for indicating the flow through said conduit.

7. In apparatus adapted to measure a stream partially filling a conduit, the combination of a pipe section shaped at one end to correspond with a conduit from which it receives liquid and varied smoothly and gradually in cross section from that end to provide at its other end an outlet in the form of a half ellipse with its minor axis at the top, said pipe section being inclined downwardly toward its outlet and discharging therefrom to a lower level whereby in connection with the narrowed lower part of the pipe section the velocity for smaller flows will be increased and deposits of material in that part will be prevented, a flap of substantially the same shape and size as said outlet extending from above across said outlet to be swung outwardly by impact of the liquid, and flow indicating means operated by said flap.

8. In apparatus for measuring the gravity flow of a stream partially filling a conduit, the combination of a conduit having at one end an outlet narrowed toward its bottom to increase the velocity of discharge for small flows, such gravity-flow stream being liberated as it is discharged from said outlet, a flap suspended from above across said outlet so as to be swung outwardly by the impact of the stream thereagainst, the lower end of the flap being shaped substantially to fit the corresponding lower portion of said outlet, and means operated by said flap to indicate the flow through said conduit.

9. In apparatus for measuring the flow of a stream partially filling a conduit, the combination of a conduit having at one end an outlet narrowed toward its bottom to increase the velocity of discharge for small flows, means for indicating the rate of flow through said conduit, and means for operating such indicating means including a flap suspended from above across said outlet so as to be swung outwardly by the impact of the stream thereagainst, the lower end of said flap having a central portion terminating substantially at the bottom of said outlet and at opposite sides of said central portion ears projecting beyond the same to assist in lifting the flap in correspondence to the larger rates of flow.

10. In apparatus for measuring the flow of a stream partially filling a conduit, the combination of a conduit having at one end an outlet narrowed toward its bottom to increase the velocity of discharge for small flows, means for indicating the rate of flow through said conduit, and means for operating such indicating means including a flap suspended from above across said outlet so as to be swung outwardly by the impact of the stream thereagainst, the lower end of said flap having a central portion terminating substantially at the bottom of said outlet and at opposite sides of said central portion ears projecting beyond the same to assist in lifting the flap in correspondence to the larger rates of flow, said ears turning rearwardly with reference to said stream to increase their effect and obtain the proper lifting of flap for the larger rates of flow.

11. In apparatus for measuring the flow of a stream partially filling a conduit, the combination of a conduit having at one end an outlet narrowed toward its bottom to increase the velocity of discharge for small flows, means for indicating the rate of flow through said conduit, and means for operating such indicating means including a flap suspended from above across said outlet so as to be swung outwardly by the impact of the stream thereagainst, the lower end of said flap having a central portion terminating substantially at the bottom of said outlet and at opposite sides of said central portion ears projecting beyond the same to assist in lifting the flap in correspondence to the larger rates of flow, said ears turning rearwardly substantially in arcs of circles.

12. In apparatus for measuring the flow of a stream partially filling a conduit, the combination of a conduit having at one end an outlet narrowed toward its bottom to increase the velocity of discharge for small flows, means for indicating the rate of flow through said conduit, and means for operating such indicating means including a flap suspended from above across said outlet so as to be swung outwardly by the impact of the stream thereagainst, the lower end of said flap having a central portion terminating substantially at the bottom of said outlet and at opposite sides of said central portion ears projecting beyond the same to assist in lifting the flap in correspondence to the larger rates of flow, said ears having broad and rounded forward ends of which the curvature gradually changes until their edges gradually merge with the edge of said central portion.

13. In apparatus for measuring the gravity flow of a stream partially filling a conduit, the combination of a conduit having at one end an outlet narrowed toward its bottom to increase the velocity of discharge for small flows, means for indicating the rate of flow through said conduit, and means for operating such indicating means including a flap suspended from above across said outlet so as to be swung outwardly by the impact of the stream thereagainst, the lower end of said flap having a central portion terminating substantially at the bottom of said outlet and at opposite sides of said central portion ears pojecting beyond the same to assist in lifting the flap in correspondence to the larger rates of flow, said ears turning rearwardly for a greater lifting effect by the liquid and having curved forward edges merging with the edge of said central portion.

14. In apparatus for measuring the gravity flow of a stream partially filling a conduit, the combination of a conduit arranged so that the liquid of the gravity flow will be liberated as it flows from the outlet end of said conduit, said outlet end being narrowed toward its bottom, means for indicating the rate of flow through said conduit, and means for operating such indicating means including a flap suspended from above across said outlet so as to be swung outwardly by the impact of the stream thereagainst, said flap having a central portion adapted to cooperate with the liquid stream and shift the flap for low flows and side portions adapted to cooperate with the liquid of higher flows and act to effect positioning of the flap in correspondence with the volume of such flows.

15. In a flow meter, an impact member to be swung about an axis above the same, the lower end having a central portion and projecting side portions providing a forward edge with a concavely curved part across said central portion and convexly curved parts across said side portions.

EDWIN R. SCHOFIELD.